United States Patent
Liao et al.

(10) Patent No.: US 12,159,356 B2
(45) Date of Patent: Dec. 3, 2024

(54) AUGMENTED REALITY INTERACTION SYSTEM, SERVER AND MOBILE DEVICE

(71) Applicant: INSTITUTE FOR INFORMATION INDUSTRY, Taipei (TW)

(72) Inventors: Hsien Cheng Liao, Taipei (TW); Jia Wei Hong, Taipei (TW)

(73) Assignee: INSTITUTE FOR INFORMATION INDUSTRY, Taipei (TW)

( * ) Notice: Subject to any disclaimer, the term of this patent is extended or adjusted under 35 U.S.C. 154(b) by 226 days.

(21) Appl. No.: 17/991,836

(22) Filed: Nov. 21, 2022

(65) Prior Publication Data

US 2024/0161416 A1    May 16, 2024

(30) Foreign Application Priority Data

Nov. 11, 2022  (TW) .................................. 111143134

(51) Int. Cl.
*G06T 19/00*   (2011.01)
*H04W 4/02*   (2018.01)
*H04W 4/30*   (2018.01)

(52) U.S. Cl.
CPC .......... *G06T 19/006* (2013.01); *H04W 4/026* (2013.01); *H04W 4/30* (2018.02)

(58) Field of Classification Search
None
See application file for complete search history.

(56) References Cited

U.S. PATENT DOCUMENTS

| | | | |
|---|---|---|---|
| 2013/0196772 A1* | 8/2013 | Latta ..................... | G06T 19/006 463/42 |
| 2020/0193717 A1* | 6/2020 | Daly ..................... | H04L 9/3297 |
| 2021/0174578 A1* | 6/2021 | Jurgenson ............... | G06T 17/00 |
| 2021/0192781 A1* | 6/2021 | Ohashi ..................... | G06T 7/20 |
| 2023/0215106 A1* | 7/2023 | Brown .................. | G01C 21/20 345/633 |

FOREIGN PATENT DOCUMENTS

| | | |
|---|---|---|
| CN | 108693959 A | 10/2018 |
| CN | 113129411 A | 7/2021 |
| CN | 113728362 A | 11/2021 |

* cited by examiner

*Primary Examiner* — Nurun Flora
(74) *Attorney, Agent, or Firm* — Li & Cai Intellectual Property Office

(57) ABSTRACT

An augmented reality interaction system applied to a physical scene and comprising a server and a plurality of mobile devices is provided. The server stores a point cloud map corresponding to the physical scene, and one of the mobile devices uploads a physical image, role state variation data and local variation data to the server. The server compares the physical image with the point cloud map to generate orientation data of the mobile device in real time, and adjusts role data corresponding to a user according to the role state variation data and the local variation data. The server pushes the orientation data of the mobile device and the role data to the other mobile devices such that augmented reality images displayed by the other mobile devices are adjusted in real time according to the orientation data of the mobile device and the role data.

8 Claims, 3 Drawing Sheets

AUGMENTED REALITY INTERACTION SYSTEM, SERVER AND MOBILE DEVICE

FIELD OF THE INVENTION

The present disclosure relates to an augmented reality display solution, are more particularly, to an augmented reality interaction system, an augmented reality interaction method, a server and a mobile device that are applicable to outdoor scenes and multi-player on-line experience.

BACKGROUND OF THE INVENTION

Virtual Reality (VR), Augmented Reality (AR) and Mixed Reality (MR) are very popular technologies in the fields of image processing, computer vision and computer graphics at present, and have been widely applied to fields of teaching, experiments and electronic sports. From simply the interaction between a user and an AR object provided in the beginning, the technologies have been gradually developed to be able to show the interaction with other users on a device. For example, a virtual object in the AR technology may change with the interaction between the user and a scene, thereby maintaining the AR effect. For example, given that the user originally faces the front surface of the virtual object in the AR, when the user moves to the side surface of the virtual object, the display device must be able to show the side surface of the virtual object to the user in real time.

In order to enable a calculator device to provide corresponding virtue content with the movement of image capture equipment, the traditional AR technology generally builds a plurality of feature-point maps in advance for physical content captured from the same target by the image capture equipment in various positions and/or directions, and when the position and/or direction of the image capture equipment is changed, the traditional AR technology can identify the current position and/or current direction of the image capture equipment by means of feature points on the feature point-maps, thereby acquiring the position change and/or direction change of the image capture equipment. Therefore, with the movement of the image capture equipment, the traditional AR technology can provide the corresponding virtual content according to the position variation and/or direction variation of the image capture equipment.

A prior art solution provides a solution capable of showing the interaction between players, in which a background is marked in an indoor environment. For example, the feature points are provided on a wall, so as to generate displacement data when the players act or moves relative to the background, and then an AR device can display changes of the action and the state of an opponent in an AR image according to the displacement data. However, the above-mentioned solution is only applicable to the indoor environment within 66.114 square meters at present, it will be difficult to identify different players when the number of the players increases, and there is still room for improving the experience of users.

To sum up, there is a need for a novel AR display method and a related system to improve the above-mentioned problems of the traditional AR technology.

SUMMARY OF THE INVENTION

Aiming to fulfill the above requirements, an objective of the present disclosure is to provide an immersive experience of multi-player interaction in outdoor environments.

In order to achieve the above objective, an embodiment of the present disclosure provides an augmented reality interaction system applied to a physical scene and comprising a server and a first mobile device and at least one second mobile device that is communicatively connected with the server. The server stores a point cloud map corresponding to the physical scene, and the first mobile device uploads a physical image, role state variation data and local variation data to the server. The server compares the physical image with the point cloud map to generate orientation data of the first mobile device in real time, and adjusts role data corresponding to a user according to the role state variation data and the local variation data. The server pushes the orientation data of the first mobile device and the role data to the at least one second mobile device such that an augmented reality image displayed by the at least one second mobile device is adjusted in real time according to the orientation data of the first mobile device and the role data.

Another embodiment of the present disclosure provides an augmented reality interaction method applied to a physical scene. The method comprises: shooting the physical scene to generate a point cloud map corresponding to the physical scene; storing the point cloud map in a server; uploading, by a first mobile device, a physical image, role state variation data and local variation data to the server; comparing, by the server, the physical image with the point cloud map to generate orientation data of the first mobile device in real time, and adjusting role data corresponding to a user according to the role state variation data and the local variation data; and pushing, by the server, the orientation data of the first mobile device and the role data to at least one second mobile device such that an augmented reality image displayed by the at least one second mobile device is adjusted in real time according to the orientation data of the first mobile device and the role data.

Another embodiment of the present disclosure provides a server, comprising a global positioning module, a database and a synchronization module. The global positioning module stores a point cloud map corresponding to a physical scene and is configured to compare received data with the point cloud map. The database is communicatively connected with the global positioning module and is configured to store orientation data and role data. The synchronization module is communicatively connected with the database and is configured to push the orientation data of a first mobile device and the role data to at least one second mobile device such that an augmented reality image displayed by the at least one other mobile device is adjusted in real time according to the orientation data of the mobile device and the role data.

Another embodiment of the present disclosure provides a mobile device provided with applications associated with a plurality of physical scenes, the mobile device comprising a processing module, an image capture module, a communication module and a display module. The processing module is configured to execute the applications, and the image capture module is configured to capture an image. The image comprises a first physical scene image, associated with the physical scenes, and a player image, the player image corresponds to an electronic device, and the electronic device is configured to capture a second physical scene image associated with the physical scenes; and the communication module is coupled with the processing module and is communicatively connected with a server, wherein the server stores a point cloud map corresponding to the physical scenes and compares the first physical scene image and the second physical scene image with the point cloud map respectively so as to generate orientation data of the mobile device and orientation data of the electronic device respectively. The display module is configured to display the orientation data of the mobile device, the orientation data of the electronic device and a virtual object corresponding to the player image.

To sum up, the technical solution of the present disclosure can provide a multi-player virtual reality interaction solution in an outdoor scene, without being limited to a small, indoor area, so that the existing bottleneck can be effectively solved. In addition, the technical solution of the present disclosure can be implemented by general smart phones, so users do not need to buy additional equipment, thereby saving a lot of costs.

DETAILED DESCRIPTION OF PREFERRED EMBODIMENTS

The present disclosure is particularly described by following examples which are only used for illustration. For those who are familiar with the technologies, various modifications and embellishments can be made without departing from the spirit and scope of the present disclosure, so the scope of protection of the present disclosure shall be subject to that defined in the scope of patent application attached hereto. In the entire specification and within the scope of patent application, unless clearly specified in the content, "a/an" and "the" have meanings that such descriptions include "one or at least one" assembly or component. In addition, as used in the present disclosure, unless the plural use is obviously excluded according to the specific context, singular terms may also be used to present plural assemblies or components. Unless otherwise specified, each of terms used in the entire specification and within the scope of patent application usually has the common meaning of the term used in this field, in the disclosure and in the special content. Certain terms used to describe the disclosure will be discussed below or elsewhere in this specification, so as to provide additional guidance, for practitioners, on the description of the disclosure. The examples throughout the entire specification, including the terms discussed herein, are only for illustration, and are not meant to limit the scope and meanings of the disclosure or any illustrative terms. Similarly, the present disclosure is not limited to various embodiments provided in this specification.

In addition, the term "electrical coupling" or "electrical connection" or "communicative connection" used herein includes any direct and indirect electrical connection means, as well as wireless or wired connection means. For example, if the expression that a first device is electrically coupled with a second device appears in the article, it means that the first device can be directly connected to the second device, or be indirectly connected to the second device through other devices or connection means.

It can be understood that terms "comprising", "including", "having", "containing" and "involving" used herein are open-ended, meaning including but not limited to. In addition, any embodiment of the present disclosure or the scope of patent application need not achieve all the purposes or advantages or features disclosed in the present disclosure. Besides, the abstract and the title are only used to assist in searching patent documents, not to limit the scope of patent application of the present disclosure.

Figure 1:
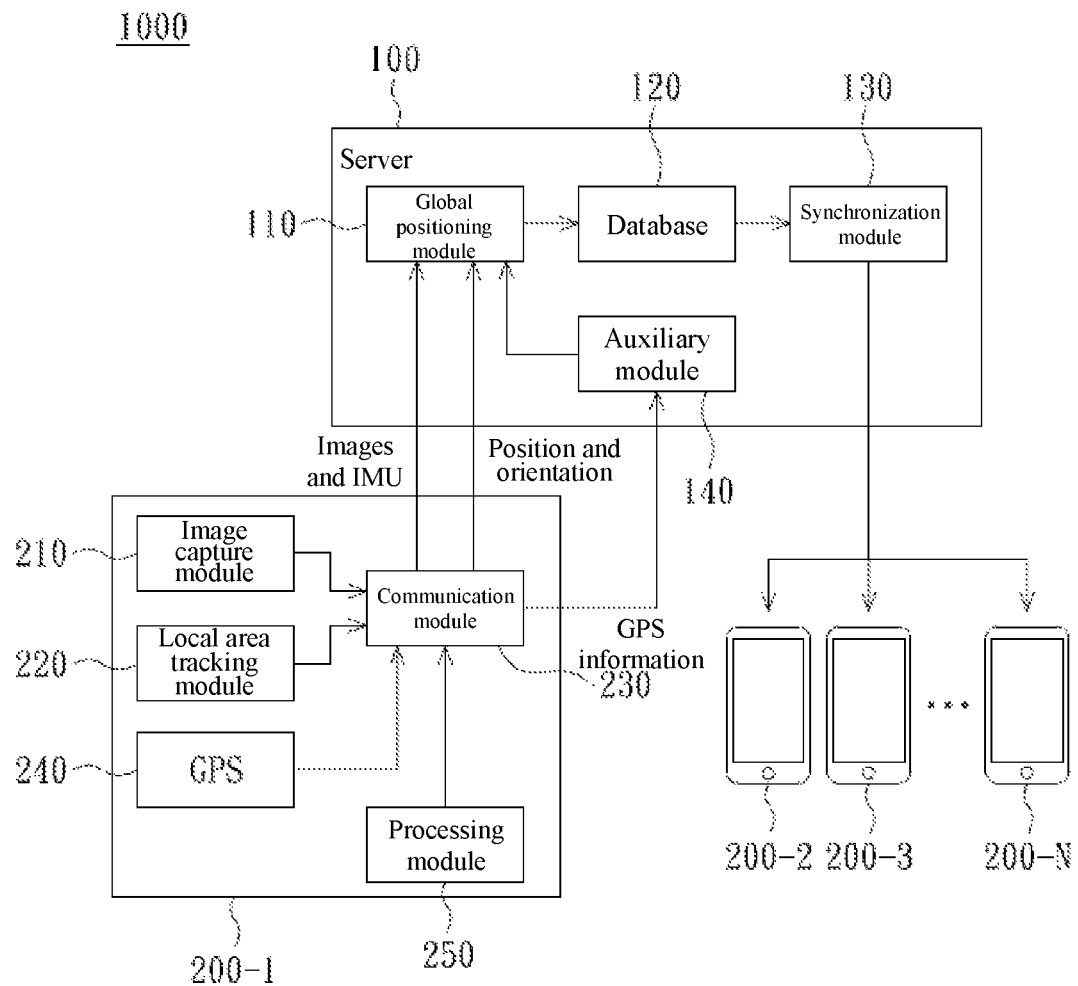
FIG. 1 is a schematic diagram of an augmented reality interaction system according to one embodiment of the present disclosure.

Referring to FIG. 1, FIG. 1 is a schematic diagram of an augmented reality interaction system 1000 according to one embodiment of the present disclosure, and the augmented reality interaction system 1000 is applied to a physical scene and comprises a server 100 and a plurality of mobile devices 200-1, 200-2, 200-3, . . . , 200-N. The server 100 stores a point cloud map corresponding to the physical scene, and the mobile device 200-1 of the mobile devices 200-1, 200-2, 200-3, . . . , 200-N transmits an image, role state variation data and local variation data to the server. The image transmitted by the mobile device 200-1 to the server may include a physical scene image of the physical scene and may also include a player image. The server 100 compares the physical scene image with the point cloud map to generate orientation data of the mobile device 200-1 in real time, and adjusts role data corresponding to a user (i.e., a user of the mobile device 200-1 that may be a player) according to the role state variation data and the local variation data. The server 100 pushes the orientation data of the mobile device 200-1 and the role data to the mobile devices 200-2, 200-3, . . . , 200-N such that augmented reality images displayed by the mobile devices 200-2, 200-3, . . . , 200-N are adjusted in real time according to the orientation data of the mobile device 200-1 and the role data. The mobile devices 200-1, 200-2, 200-3, . . . , 200-N may be equipment having image capturing and three-dimensional mobile detection functions, e.g., smart phones, tablet computers, smart glasses and Metaverse goggles.

Means for making the point cloud map may comprise shooting the physical scene in various angles, and then building the point cloud map using the captured images. Then, after the mobile device (e.g., one of the mobile devices 200-1, 200-2, 200-3, . . . , 200-N) uploads the captured physical scene image, the physical scene image may be compared with the point cloud map so as to generate the relative position and orientation of the mobile device with regard to the physical scene when the mobile device shoots the physical scene image.

The server 100 comprises a global positioning module 110, a database 120, a synchronization module 130 and an auxiliary module 140. The global positioning module 110 stores the point cloud map corresponding to the physical scene and is configured to compare received data (e.g., the physical scene image in the image uploaded by the mobile device) with the point cloud map, so as to determine the position and orientation of the user. The database 120 is communicatively connected with the global positioning module 110 and is configured to store the orientation data and the role data. The synchronization module 130 is communicatively connected with the database and is configured to push the orientation data of the mobile device 200-1 and the role data to the mobile devices 200-2, 200-3, . . . , 200-N. The auxiliary module 140 is configured to receive GPS information from the mobile device. In some embodiments, the auxiliary module may be integrated into the global positioning module 110 or the database 120.

In addition to uploading the image to the global positioning module 110, the mobile device 200-1 also uploads the role state variation data and the local variation data to the database 120. The global positioning module 110 compares the physical scene image with the point cloud map to generate the orientation data of the mobile device 200-1 in real time, and adjusts the role data corresponding to the user of the mobile device 200-1, according to the role state variation data and the local variation data of the mobile device 200-1.

For example, any of the mobile devices 200-1, 200-2, 200-3, . . . , 200-N may be provided with applications associated with virtual reality applications and comprise an image capture module 210, a local area tracking module 220, a communication module 230, a positioning module 240 (marked as "GPS" in the figure) and a processing module 250. The mobile devices 200-1, 200-2, 200-3, . . . , 200-N may also comprise a display module (not shown in the figure). For example, any one of the mobile devices 200-1, 200-2, 200-3, . . . , 200-N may comprise a memory and a storage space (not marked in the figure) to install the applications. The image capture module 210 may be, for example, a photographic lens and/or an image processing unit. The local area tracking module 220 may be an inertial measurement unit (IMU) (also known as an inertial measurement instrument, an attitude module and a gyroscope) and is configured to detect the three-dimensional data of the mobile device, for example, acquiring the six-axis variation of the mobile device. The positioning module 240 is coupled with the communication module 230 and is configured to detect the position of the mobile device and generate position data, wherein the communication module 230 transmits the position data, received from the positioning module 240, to the auxiliary module 140 of the server 100. The processing module 250 may be a common design of chips of the smart phones, and is not further described here for brevity.

The processing module 250 executes the above-mentioned applications and generates the role state variation data. The applications may be game software involving the virtual-real interaction, and the role state variation data may be hit point changes, clothing changes and hand or head action details of virtual characters, or messages or slogans accompanying the virtual characters. The role data integrates the role state variation data and the local variation data and may contain other types of data. Compared with real-time updating of the role state variation data and the local variation data (e.g., once every 1 second or less), the role data may be updated less frequently (e.g., once every 3 to 5 seconds).

Furthermore, the image capture module 210 is configured to shoot the physical scene so as to acquire the physical scene image, and the local area tracking module 220 is configured to perform inertial measurement so as to acquire three-dimensional variation data corresponding to the mobile device 200-1, the three-dimensional variation data being used as the local variation data. The communication module 230 is coupled with the processing module 250, the image capture module 210 and the local area tracking module 220, and is communicatively connected with the server 100 so as to transmit the role state variation data received from the processing module 250, the physical scene image received from the image capture module 210, and the local variation data received from the local area tracking module 220, to the server 100 according to the applications.

The server 100 stores the point cloud map corresponding to the physical scene, compares the physical scene image with the point cloud map to generate the orientation data of the mobile device 200-1 in real time, and adjusts the role data corresponding to the user, according to the role state variation data and the local variation data. The server pushes the orientation data of the mobile device and the role data to the mobile devices 200-2, 200-3, . . . , 200-N such that the augmented reality images displayed by the mobile devices 200-2, 200-3, . . . , 200-N are adjusted in real time according to the orientation data of the mobile device and the role data.

Figure 2:
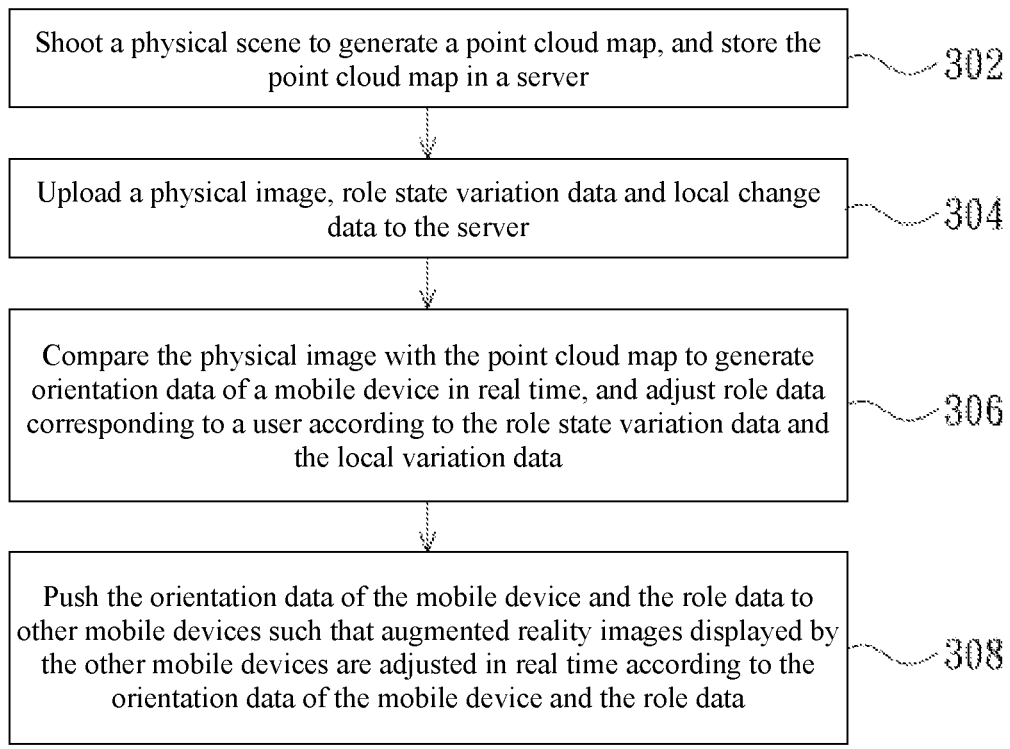
FIG. 2 is a flowchart of an augmented reality interaction method according to one embodiment of the present disclosure.

Referring to FIG. 2, FIG. 2 is a flowchart of an augmented reality interaction method according to one embodiment of the present disclosure. Note that if substantially the same results can be obtained, it is not necessary to execute these steps in the execution sequence shown in FIG. 2. The method shown in FIG. 2 may be adopted by the augmented reality interaction system 1000 shown in FIG. 1. Note that if the same or similar effects can be achieved, the execution order of the augmented reality interaction method of the present disclosure may not be exactly as shown in FIG. 2, and additional steps may be inserted therebetween. The summary of steps in FIG. 2 is as follows:

Step 302: Shoot a physical scene to generate a point cloud map, and storing the point cloud map in a server;

Step 304: Upload a physical scene image, role state variation data and local variation data to the server;

Step 306: Compare the physical scene image with the point cloud map to generate orientation data of a mobile device in real time, and adjusting role data corresponding to a user according to the role state variation data and the local variation data; and Step 308: Push the orientation data of the mobile device and the role data to other mobile devices such that augmented reality images displayed by the other mobile devices are adjusted in real time according to the orientation data of the mobile device and the role data.

Since a skilled person may easily understand details of each step in FIG. 2 after reading the paragraphs above, for the sake of simplicity, further descriptions are omitted here.

Figure 3:
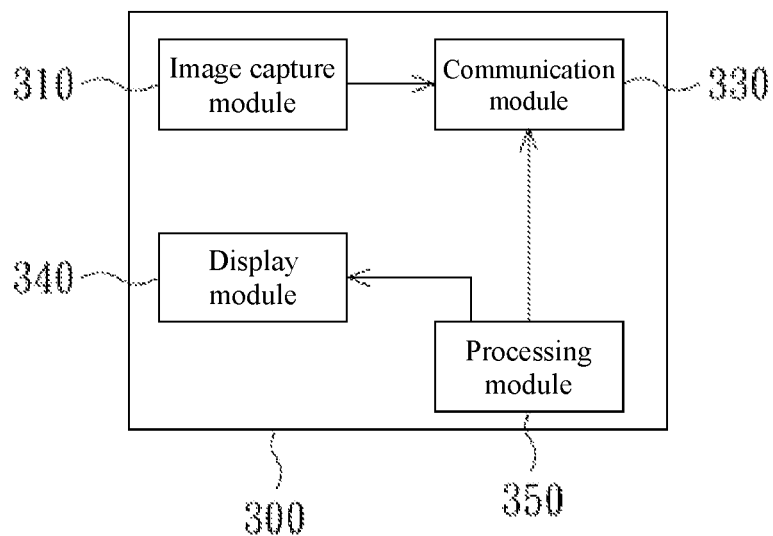
FIG. 3 is a schematic diagram of a mobile device according to one embodiment of the present disclosure.
Figure 4:
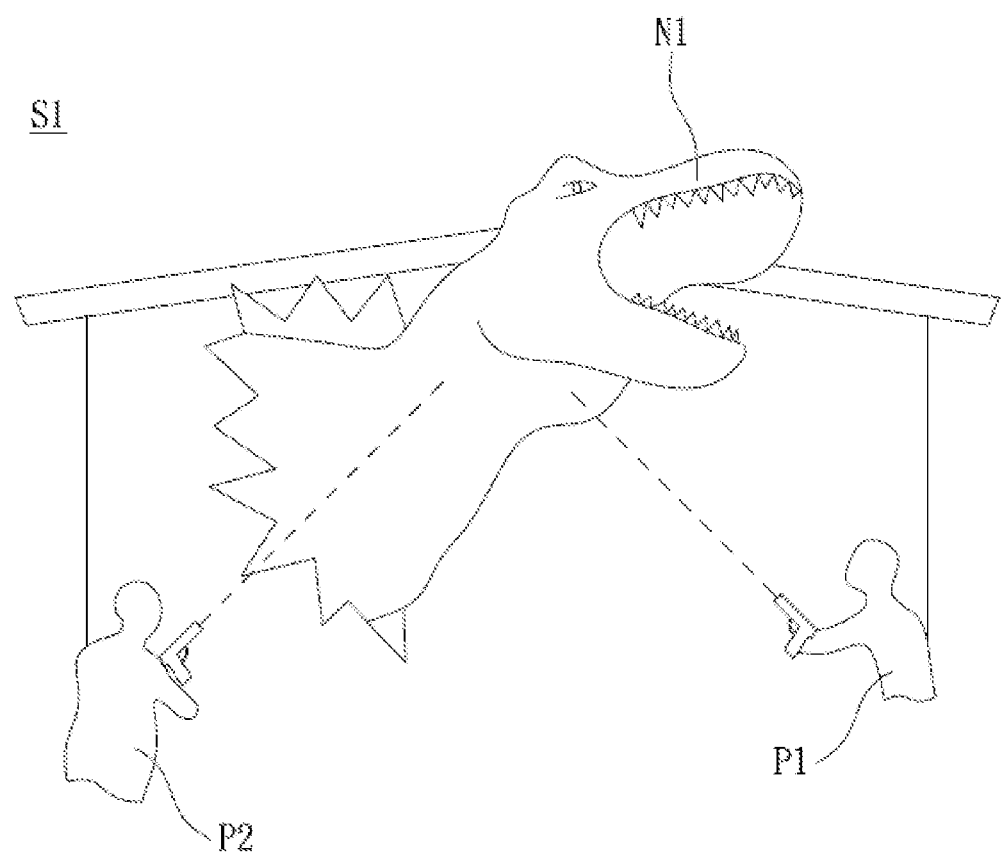
FIG. 4 is a schematic diagram of a first physical scene image corresponding to the augmented reality interaction system of the present disclosure.
Figure 5:
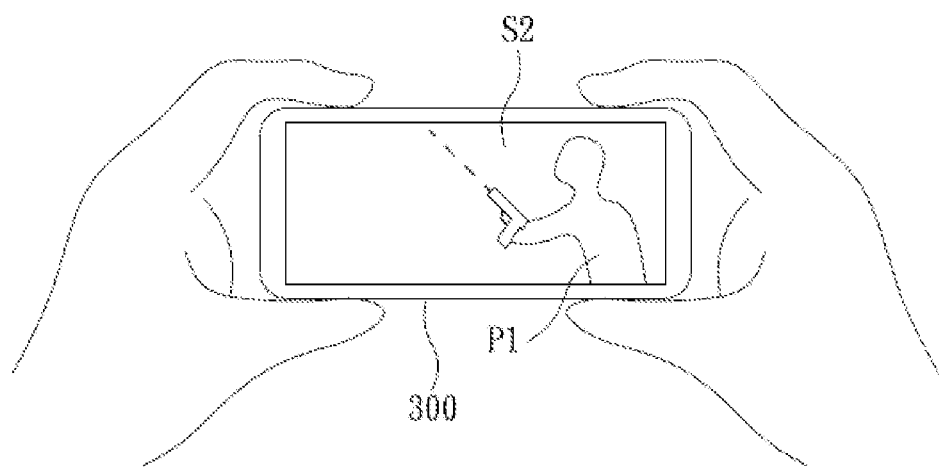
FIG. 5 is a schematic diagram of a second physical scene image corresponding to the augmented reality interaction system of the present disclosure.

Referring to FIG. 3 to FIG. 5 together, FIG. 3 is a schematic diagram of a mobile device 300 according to one embodiment of the present disclosure, and the mobile device is provided with applications associated with a plurality of physical scenes, for example, the mobile device 300 may comprise a memory and a storage space (not marked in the figure) to install the applications. As shown in FIG. 3, the mobile device 300 comprises an image capture module 310, a communication module 330, a display module 340 and a processing module 350. The processing module 350 is configured to execute the applications, and the image capture module 310 is configured to capture images, for example, a first physical scene image associated with the plurality of physical scenes and a player image (referring to FIG. 4 and relevant instructions). The player image corresponds to an electronic device, and the electronic device is configured to capture a second physical scene image associated with the physical scenes (referring to FIG. 5 and relevant instructions). In detail, for one player, the electronic device may be, for example, the mobile device held or worn by another player. The communication module 330 is coupled with the processing module 350 and the image capture module 310, and is communicatively connected with a server (e.g., the server 100 in the aforementioned embodiment), wherein the server stores a point cloud map corresponding to the physical scene, compares the first physical scene image and the second physical scene image with the point cloud map respectively so as to generate orientation data of the mobile device and orientation data of the electronic device respectively. The server transmits the orientation data of the mobile device and the orientation data of the electronic device to the communication module. The display module 350 is configured to display a corresponding virtual object according to the orientation data of the mobile device, the orientation data of the electronic device, and the player image.

FIG. 4 is a schematic diagram of the first physical scene image S1 corresponding to the augmented reality interaction system 1000 of the present disclosure, and FIG. 5 is a schematic diagram of the second physical scene image S2 corresponding to the augmented reality interaction system 1000 of the present disclosure, wherein players P1, P2 are playing a shooting themed game by means of the augmented reality interaction system 1000, the players P1, P2 both hold the mobile devices 300 for playing, and the mobile devices 300 may be equipment having image capturing and three-dimensional mobile detecting functions, and meanwhile comprising a display module, e.g., smart phones, tablet computers, smart glasses and Metaverse goggles. As shown in FIG. 4, the players P1, P2 are shooting a virtual object N1 (represented by a dinosaur, but not limited to this in the present disclosure) in the first physical scene image S1, and at present, the first physical scene image S1 is an image displayed by a mobile device of a player P3 behind the players P1, P2. Since various data (e.g., the orientation data, the virtual object, the role state variation data and the local variation data) of the player P1 at this moment is pushed to other players by means of the augmented reality interaction system 1000 in real time, when the player P3 turns his/her shooting angle to the player P1, the second physical scene image S2 is captured (as shown in FIG. 5), and the state of the player P1 (e.g., position changes of the head and hands, the armfire aiming angle, the injured state of the character, the display of hit points, the marked words or expression patterns) will also be updated in a picture. Thus, the simulation and interaction effects of the game can be greatly improved, and the present disclosure is applicable to various indoor or outdoor sites for play.

Although the present invention has been disclosed by examples, it is not intended to limit the scope of the invention. Those skilled in the art are readily to make changes and embellishments without departing from the spirit and scope of the present invention. Therefore, the scope of the present invention should base on what is defined in the appended claims.

What is claimed is:

1. An augmented reality interaction system applied to a physical scene, the augmented reality interaction system comprising:
    a server for storing a point cloud map corresponding to the physical scene;
    a first mobile device communicatively connected with the server, wherein the first mobile device uploads a physical scene image, role state variation data and local variation data to the server, and the server compares the physical scene image with the point cloud map to generate orientation data of the first mobile device in real time, and adjusts role data corresponding to a user according to the role state variation data and the local variation data; and
    at least one second mobile device communicatively connected with the server;
    wherein the server pushes the orientation data of the first mobile device and the role data to the at least one second mobile device such that an augmented reality image displayed by the at least one second mobile device is adjusted in real time according to the orientation data of the first mobile device and the role data.

2. The augmented reality interaction system according to claim 1, wherein the first mobile device comprises:
    an image capture module configured to shoot the physical scene so as to acquire the physical scene image;
    a local area tracking module configured to perform inertial measurement so as to acquire three-dimensional variation data corresponding to the first mobile device, the three-dimensional variation data being used as the local variation data; and
    a communication module coupled with the image capture module and the local area tracking module, and communicatively connected with the server, so as to transmit the physical scene image received from the image capture module, and the local variation data received from the local area tracking module, to the server.

3. The augmented reality interaction system according to claim 2, wherein the first mobile device further comprises:
    a positioning module coupled with the communication module and configured to detect the position of the first mobile device and generate position data, wherein the communication module transmits the position data received from the positioning module to the server.

4. The augmented reality interaction system according to claim 1, wherein the server comprises:
    a global positioning module storing the point cloud map and configured to compare the physical scene image with the point cloud map to generate the orientation data of the first mobile device in real time;
    a database communicatively connected with the global positioning module and configured to store the orientation data and the role data; and
    a synchronization module communicatively connected with the database and configured to push the orientation data of the first mobile device and the role data to the at least one second mobile device.

5. A server, comprising:
    a global positioning module storing a point cloud map corresponding to a physical scene, and configured to compare received data with the point cloud map;
    a database communicatively connected with a global positioning module and configured to store orientation data and role data corresponding to a user; and
    a synchronization module communicatively connected with the database and configured to push the orientation data of a first mobile device and the role data to at least one second mobile device such that an augmented reality image displayed by the at least one other mobile device is adjusted in real time according to the orientation data of the mobile device and the role data, wherein the first mobile device uploads a physical scene image to the global positioning module and uploads role state variation data and local variation data to the database, and the global positioning module compares the physical scene image with the point cloud map to generate the orientation data of the first mobile device in real time, and adjusts, the role data according to the role state variation data and the local variation data.

6. A mobile device provided with applications associated with a plurality of physical scenes, the mobile device comprising:

a processing module configured to execute the applications;

an image capture module configured to capture an image, wherein the image comprises a first physical scene image, associated with the physical scenes, and a player image, the player image corresponds to an electronic device, and the electronic device is configured to capture a second physical scene image associated with the physical scenes;

a communication module coupled with the processing module and the image capture module and communicatively connected with a server, wherein the server stores a point cloud map corresponding to the physical scenes, compares the first physical scene image and the second physical scene image with the point cloud map respectively so as to generate orientation data of the mobile device and orientation data of the electronic device respectively, and transmits the orientation data of the mobile device and the orientation data of the electronic device to the communication module; and a display module configured to display the orientation data of the mobile device, the orientation data of the electronic device and a virtual object corresponding to the player image.

7. The mobile device according to claim 6, further comprising:

a local area tracking module configured to perform inertial measurement so as to acquire three-dimensional variation data corresponding to the mobile device, the three-dimensional variation data being used as local variation data; and the communication module periodically transmits the local variation data to the server.

8. The mobile device according to claim 7, further comprising:

a positioning module coupled with the communication module and configured to detect the position of the mobile device and generate position data, wherein the communication module transmits the position data, received from the positioning module, to the server.

* * * * *